US005714092A

United States Patent [19]
van Looij et al.

[11] Patent Number: 5,714,092
[45] Date of Patent: Feb. 3, 1998

[54] PROCESS FOR THE PRODUCTION OF HYDROGEN/CARBON MONOXIDE MIXTURES OR HYDROGEN FROM METHANE

[75] Inventors: Francine van Looij, Utrecht; John Wilhelm Geus, Bilthoven, both of Netherlands

[73] Assignee: Gastec, N.V., Apeldoorn, Netherlands

[21] Appl. No.: 545,804

[22] PCT Filed: May 16, 1994

[86] PCT No.: PCT/NL94/00115

§ 371 Date: Jan. 22, 1996

§ 102(e) Date: Jan. 22, 1996

[87] PCT Pub. No.: WO94/26656

PCT Pub. Date: Nov. 24, 1994

[30] Foreign Application Priority Data

May 13, 1993 [NL] Netherlands ............... 9300833

[51] Int. Cl.$^6$ .................. C07C 1/02; C09K 3/00; B01J 33/00
[52] U.S. Cl. ........... 252/373; 252/372; 502/337
[58] Field of Search ............... 252/373; 11/372; 518/700; 502/337

[56] References Cited

U.S. PATENT DOCUMENTS 5,206,202  4/1993  Lachman.

FOREIGN PATENT DOCUMENTS

| 0112613 | 7/1984 | European Pat. Off. . |
| 0327177 | 8/1989 | European Pat. Off. . |
| 2048102 | 12/1980 | United Kingdom . |
| 2139644 | 11/1984 | United Kingdom . |
| 2 247 65 | 3/1992 | United Kingdom . |
| 2247465 | 3/1992 | United Kingdom . |

*Primary Examiner*—Gary Geist
*Assistant Examiner*—Karl J. Puttlitz, Jr.
*Attorney, Agent, or Firm*—Weingarten, Schurgin, Gagnebin & Hayes LLP

[57] ABSTRACT

The invention relates to a process for the endothermic catalytic conversion of gaseous hydrocarbons with steam to form a gaseous mixture containing hydrogen, utilizing a reform catalyst based on nickel provided on a thermostable support, wherein at least 90% of the nickel particles (based on the number) are smaller than 10 nm and at least a part of the thermal energy required for the endothermic conversion is generated in the reaction mixture through a controlled catalytic reaction of a part of the hydrocarbon with oxygen.

20 Claims, No Drawings

PROCESS FOR THE PRODUCTION OF HYDROGEN/CARBON MONOXIDE MIXTURES OR HYDROGEN FROM METHANE

According to the present state of the art, mixtures of hydrogen and carbon monoxide are produced by reacting methane with steam, the so-called methane-steam reform process. If only hydrogen is desired, the carbon monoxide is allowed to react with steam to form carbon dioxide and hydrogen. The carbon dioxide formed is removed by dissolving under pressure in aqueous solutions or regenerable solid sorbents.

In addition to methane, other gaseous hydrocarbons or naphtha or other hydrocarbons that can be readily brought into the gaseous phase, can be employed for this process.

By radiation the reaction heat generated in the combustion reaction is transferred to the reaction mixture. The reaction mixture is passed through tubes of a high-grade alloy in which a suitable catalyst has been provided. The tubes are exposed to the radiation of the burners.

To enable the highly endothermic reaction between methane and steam to proceed, the required reaction heat has to be supplied to the reaction mixture at a high temperature, for instance 850° C. (allothermic process). In general, the required heat is generated outside the reaction mixture through combustion of, for instance, methane. In order to transfer the so generated thermal energy to the reaction mixture, a reactor wall with a sufficiently high thermal conductivity has to be employed.

To prevent oxidation at the required high temperatures, costly (nickel-containing) alloys have to be used for the reactor wall. Through radiation the reaction heat generated in the combustion reaction is transferred to the reaction mixture. The reaction mixture is passed through tubes of a high-grade alloy in which a suitable catalyst has been provided. The tubes are exposed to the radiation of the burners. To save compression labor, the methane-steam reforming is often carried out at elevated pressure, for instance at 30 bar, which imposes even more stringent requirements on the oxidation resistance.

It is attractive to work with the lowest possible steam/methane ratio. Theoretically, a ratio of 1 is necessary to react methane with steam according to:

$$CH_4 + H_2O \rightarrow CO + 3H_2 \qquad (1)$$

In practice, however, to prevent the deposition of carbon on the catalyst, a higher steam/methane ratio has to be used, viz. 2 to 3.

For the methane-steam reforming process a nickel catalyst is used. In order to obtain a sufficient thermal stability, the nickel is provided on a thermostable support, such as α-aluminum oxide or magnesium aluminate (spinel). To effect a sufficiently fast transport of thermal energy in the catalyst bed, relatively large catalyst bodies of different forms are used.

Although the methane-steam reform process has long been used with excellent results, it has a few major drawbacks. First of all, the fact applies that much thermal energy is generated in the flue gas and in the process gas of the plant, which has to be recovered for economic reasons. This leads to the production of much (high-pressure) steam, which cannot always be properly used. Another problem is that for a complete conversion of the methane supplied to the process at elevated pressure, a relatively high temperature has to be set, viz. between about 800° and 1000° C. At temperatures above 850° C., the life of the pipes in which the catalyst is provided is shortened. It is also desirable to obtain a greater flexibility in the carbon monoxide/hydrogen ratio in the gas mixture produced.

The hydrogen content can be markedly increased by carrying out the so-called carbon monoxide shift conversion reaction in two steps, one at a high and one at a lower temperature:

$$CO + H_2O \rightarrow CO_2 + H_2$$

However, such an implementation of the process requires two reactors for the shift reaction alone, and fairly much thermal energy has to be dissipated at a relatively low temperature in order to shift the equilibrium of this reaction to the right.

If it is desired to work with a $H_2/CO$ ratio of less than three, as with methanol synthesis or the Fischer-Tropsch reaction, special measures have to be taken. The last drawback of the methane-steam reform process is that it can be implemented efficiently only on a small scale. In the case where hydrogen-oxygen fuel cells are used, it would be particularly advantageous if hydrogen could be produced on a small scale with high efficiency. In particular the necessity of recovering the heat present at high temperatures has as a consequence that the process cannot be readily implemented on a small scale in an economically acceptable way.

The above-discussed disadvantages have given rise to the development of an autothermic process rather than an allothermic process (a process where the required reaction heat is generated outside the reaction system and is supplied to the reaction system through a reactor wall). In an autothermic process the required reaction heat is generated in the reaction system. The required reactor is then much less costly because the reactor can be coated with a refractory material, which is impossible in the case of an allothermic process on account of the small thermal conductivity of refractory material.

In the case of raw materials of a low reactivity, such as fuel oil, the reaction has to be carried out at such high temperatures that an allothermic process is not possible. Then an autothermic process has to be used. Then an autothermic process has to be used, referred to as "high pressure partial oxidation" processes.

A small part of the feed is then combusted, whereby the thermal energy required for the endothermic reaction is released. Of course, in this combustion with a minor proportion of oxygen, soot is produced, which has to be separately isolated and combusted.

In order to avoid excessive dilution of the resultant gas mixture (which would arise if air is used as oxygen source), so that the equipment to be used becomes unacceptably large, pure oxygen has to be used for generating the reaction heat. Pure oxygen is relatively costly.

The generation of the reaction heat in the methane-steam reform process, too, is sometimes carried out by combusting a part of the methane with oxygen. This is referred to as internal oxidation. This is a cumbersome process, the formation of explosive mixtures being difficult to prevent. The prevention of soot formation is also cumbersome. This internal oxidation process is used only if the high-pressure steam to be generated cannot be employed.

The object of the invention is to provide an oxidation process wherein the reaction heat is generated internally in the reaction mixture without giving rise to the danger of the formation of explosive mixtures and without soot formation, and wherein the thermal energy required to enable the endothermic reaction of the hydrocarbon with steam to proceed can be generated internally in the reaction mixture through an exothermic catalytic oxidation of a part of the hydrocarbon supplied to the process.

Such a process has previously been described in European patent application 112,613 and in British patent application 2,247,465.

With such processes, the inlet temperature and the oxygen/methane ratio are adjusted such that the temperature a the outlet of the reform catalyst takes a specified desired value. Because according to the invention a catalyst is used which enables a rapid adjustment of the equilibrium, the temperature in the Outlet of the reactor determines the gas composition.

The consequence of this method is that the reform catalyst, a nickel catalyst on a thermostable support comes into contact with a hot gas flow containing methane and steam. This has as a consequence that filamentary coal starts growing from the nickel particles. Owing to these mechanically strong filaments, the catalyst disintegrates/which leads to stoppage of the reactor. This is confirmed in the above-mentioned European patent application 112,613, which mentions the phenomenon that if nickel is used as a reform catalyst, the pressure drop across the bed increases markedly on account of soot formation. For that reason, therefore, the use of precious metals in the reform catalyst is preferred.

Surprisingly, it has now been found that if a catalyst is used in which at least 90% of the nickel particles (based on the number) are smaller than 10 nm, such carbon growth and disintegration do not occur. In accordance with the invention, therefore, use is made of a nickel catalyst whose nickel particles are smaller than 10 nm, preferably smaller than 5 nm and more particularly smaller than 3 nm.

The size of the nickel particles is determined by means of hydrogen chemisorption.

The presence of a comparatively small number of relatively large nickel particles can present considerable problems on account of the rapid growth of the carbon filaments, Therefore the nickel catalyst which is used in accordance with the invention comprises at most 10% of nickel particles greater than 10 nm. Preferably, the number of particles greater than the specified limits is less than 5%, more particularly less than 2%.

To obtain a sufficiently high activity, the reduced catalyst bust contain at least 10, preferably at least 20 and more particularly more than 30 wt. % of metallic nickel.

Of course, the catalyst which is used in accordance with the invention must be resistant at the high temperatures employed, to steam, also of high pressure, for instance 20 bar. In practice this means that the catalyst must be thermostable. Only at low steam pressures (for instance a partial pressure of 0.5 bar) can silicon dioxide then be used as support in the presence of steam aluminum oxide is more stable. In accordance with the invention, preferably a lanthanum oxide-stabilized aluminium oxide is used as support. Such a support is described, for instance, in European patent application No. 327,177.

After Stabilization at 800° C., this support has a surface of approximately 100 m$^2$/g. Of course, it is also possible to use as support the α-aluminum oxide or splnel conventionally used for methane/steam reforming.

For the application of the small nickel particles which are preferred according to the invention, a number of techniques which are known per se can be used. The catalyst which is preferably used according to the invention can be readily prepared through deposition-precipitation on a support material suspended in a nickel solution. In order to limit the reaction of the nickel with the support to form nickel aluminate as much as possible, the nickel is preferably applied through impregnation of nickel citrate or nickel-EDTA. Here, it is possible to start from preformed support bodies, which is technically attractive.

Surprisingly, it has also been found that the composition of the resultant gas mixture can be adjusted by controlling the temperature of the gas mixture after passing through the catalytic reactor in which the reaction between the hydrocarbon and steam proceeds. At a low temperature, particularly carbon dioxide and hydrogen are produced, and more carbon monoxide is formed according as the temperature is higher.

In general, it can be said that at a temperature after passage through the above-mentioned catalytic reactor of 500° C. or less, substantially carbon dioxide and hydrogen are formed, whilst above a temperature of 700° C., especially carbon monoxide and hydrogen are formed. In the range of 500° to 700° C., mixtures of the three components are formed.

It has been found that in accordance with the invention the reaction temperature and therefore the composition of the resultant gas mixture can be controlled by adjusting the temperature of the gas mixture after the oxidation. In accordance with the invention, this is effected by adjusting the fraction of the hydrocarbon which is oxidized.

The catalytic oxidation can be carried out by adding (pure) oxygen to the reaction mixture and passing this over a suitable oxidation catalyst. In accordance with the invention, the oxidation can be carried out over nickel oxide, preferably provided on a suitable support. Since the reaction between the hydrocarbon and steam and/or carbon dioxide also proceeds over a nickel catalyst, a single catalyst bed will suffice in this case. The part of the catalyst bed where the oxygen-containing reaction mixture enters is then converted to nickel oxide through the reaction with oxygen.

According to a preferred embodiment of the method according to the invention, the oxidation reaction is carried out over a separate catalyst optimized for the oxidation reaction. The oxidation reaction is preferably carried out in a separate reactor. Oxidation catalysts which are known according to the state of the art are copper oxide or manganese oxide on a thermostable support. However, a large number of other suitable oxidation catalysts are known in the art, such as for instance precious metal catalysts.

According to the invention, the entire gas flow, methane, oxygen and steam and/or carbon dioxide, can be passed through the oxidation reactor, but it is also possible to pass just methane and oxygen through the oxidation reactor and later, before the gas flow is passed into the second reactor, to add steam and/or carbon dioxide and/or methane. Especially if it is desired to produce only carbon dioxide and hydrogen, and, accordingly, it is required to work at a low final temperature, the intermediate addition of steam and/or methane is attractive. In the oxidation reactor the temperature can then be increased no a sufficiently high level to convert all oxygen. Especially if it is desired to produce only carbon monoxide and hydrogen, and, accordingly, it is required to work at a high temperature, the intermediate addition of carbon dioxide and/or methane is attractive. The temperature of the gas mixture after the oxidation can be adjusted to a sufficiently high level by controlling the ratio between oxygen and methane. The formation of a product gas in the second reactor substantially consisting of carbon dioxide and hydrogen can be produced by adding methane and/or carbon dioxide to the gas mixture resulting from the catalytic oxidation reactor.

As noted, a low steam/methane ratio is attractive. Therefore, according to a particular embodiment of the process according to the invention, only methane and the amount of oxygen required for the reaction specified below are passed to the oxidation reactor, whereafter the reaction mixture obtained is passed over the nickel catalyst:

$$CH_4 + O_2 = CO_2 + 2H_2$$

Accordingly, at a methane/oxygen ratio of one, at a low temperature exclusively hydrogen and carbon dioxide are formed. The water formed in the oxidation reactor reacts with the non-reacted methane to form carbon dioxide and hydrogen according to:

$$CH_4 + 2H_2O = CO_2 + 4H_2$$

In accordance with an alternative embodiment of the process according to the invention, oxygen uncorporated by the oxidation catalyst is used for carrying out the oxidation reaction that provides the necessary reaction heat. In that case no pure oxygen needs to be used. However, this does require periodic switching from air to methane and steam and intermediate flushing to prevent the formation of explosive gas mixtures, when a single catalyst bed is used which contains a nickel catalyst, the amount of air which is supplied to the catalyst will have to be controlled. If a separate oxidation reactor is used, the air is passed exclusively through this reactor. It has been found that at a sufficiently high temperature, reduction of the metal oxide by the methane occurs readily. The reaction heat required for the methane-steam reform process is supplied through the oxidation of the metal formed upon reduction and by the reduction reaction itself. According to the state of the art, the thermally stable oxidation catalysts required for this are known.

According to a preferred embodiment of the invention, the sensible heat which is present in the product gas is used for heating up a feed gas flow. This may for instance be the gas flow to be supplied to the oxidation reactor or the gas flow that may go to the reform reactor separately, bypassing the oxidation reactor.

The invention will now be elucidated in and by some examples.

Preparation of a nickel catalyst provided on a silicon oxide support

A catalyst which upon reduction contains 25 wt. % nickel on silicon dioxide was prepared by suspending 20 g silicon dioxide (Aerosil 380 Degussa B.R.D.) in 2 liters of demineralized water present in a precipitation vessel provided with a stirrer and baffle plates. Using diluted nitric acid, the pH of the suspension was adjusted to a value of 4. At room temperature, with careful stirring, 33.0 g nickel nitrate and 19 g urea were added to the suspension.

Then the temperature of the suspension was raised, with intensive stirring, from room temperature to 90° C. The pH of the suspension was recorded as a function of the time. After a period of about 16 hours the pH of the suspension had achieved a value of about 7 and all of the nickel had precipitated. The loaded support was filtered off and thoroughly washed with water. The loaded support was subsequently dried at 25° C. for 40 hrs, whereafter the catalyst was calcined in the air at 450° C. for 3 h. The catalyst was finally reduced in a flow of hydrogen or hydrogen-containing nitrogen at 500° C. for 3 h.

The average size of the nickel particles was determined from the hydrogen chemisorption. This was 7.1 nm. With transmission electron microscopy, nickel particles of these sizes were observed. Nickle particles greater than 9 nm were not observed.

Preparation of a nickel on magnesia oxide catalyst provided on α-aluminum oxide 12 g α-aluminum oxide was introduced into a two-neck flask provided with a cock and a septum. The temperature of the flask was increased from room temperature to 80° C. By way of the cock the flask was evacuated by means of a water jet air pump for 20 min. Then the cock to the water jet air pump was closed. A solution of 16.0 g ammonium oxalate in 50 ml demineralized water of a temperature of about 80° C. was injected by means of a syringe through the septum into the flask with the α-aluminum oxide at a temperature of about 80° C. The amount of solution injected into the flask corresponded exactly with the pore volume of the aluminum oxide tablets. After this so-called incipient wetness impregnation, the loaded aluminum oxide tablets were removed from the flask and dried at room temperature for 40 h.

The impregnated tablets were again introduced into the two-neck flask and evacuated in the manner described hereinabove. Then a second incipient wetness impregnation with a solution of 33.7 g nickel nitrate and 18.2 g magnesium nitrate in 50 ml demineralized water was carried out at room temperature. The thus impregnated tablets were dried in the air at room temperature for 40 h. The loaded support was subsequently calcined in the air at a temperature of 450° C.

The support loaded and thermally pretreated in the above manner was reduced in a flow of 10 volume parts of hydrogen in argon at 500° C. for 6 h. Then the magnitude of the hydrogen chemisorption at room temperature was determined. It was calculated from this that the average size of the nickel particles was approximately 6.5 nm. In the transmission electron microscope nickel particles of these dimensions were observed and no particles greater than about 8 nm.

EXAMPLE 1

A gas mixture consisting of hydrogen and carbon dioxide was prepared in the following way: 0.30 g of a sieve fraction from 150 to 425 μm of the nickel on silicon dioxide catalyst was introduced into a quartz reactor of a diameter of 6 mm. The catalyst was reduced in a hydrogen flow at 500° C. for 3 h.

1 g copper oxide provided on lanthanum oxide-stabilized aluminum oxide was introduced into a separate reactor which was connected in series with the reactor in which the nickel catalyst was present. The reactor with the copper oxide on aluminum oxide catalyst was maintained at a fixed temperature of 550° C. A gas flow containing 2 volume parts of methane and 1 volume part of oxygen in argon was first passed through the copper oxide catalyst and then through the nickel catalyst. The product was analyzed with a mass spectrometer (Balzers Lichtenstein).

The temperature of the reactor filled with the nickel on silicon dioxide catalyst was raised to 450° C., whilst the temperature of the reactor filled with copper oxide was maintained at 550° C. In this way a gas containing substantially exclusively carbon dioxide and hydrogen was obtained.

EXAMPLE 2

To prepare a gas mixture consisting of carbon monoxide and hydrogen, 0.30 g of a sieve fraction of 150 to 425 μm of the nickel on silicon dioxide catalyst was introduced into a quartz reactor. The catalyst was reduced in a gas flow consisting of 10 volume parts of hydrogen in argon at 500° C. for 3 h. The temperature of the reactor was then raised to 700° C. Then a gas mixture consisting of 2 volume parts of methane and 1 volume part of oxygen in argon was passed through the bed of the reduced nickel catalyst. The gas flowing from the reactor contained hydrogen and carbon monoxide in a ratio of approximately 1.8.

EXAMPLE 3

0.30 g of the nickel on silicon dioxide catalyst with a sieve fraction of 150 to 425 μm was introduced into a quartz reactor. After reduction of the catalyst in a hydrogen/argon flow at 500° C., the temperature of the reactor was increased to 700° C. Then a second reactor was filled with a catalyst in which copper oxide had been provided on lanthanum oxide-stabilized aluminum oxide. This reactor was connected upstream of the reactor with the nickel catalyst. The reactor with the copper oxide catalyst was maintained at a temperature of 550° C.

A gas mixture consisting of methane and oxygen in argon in a volume ratio of 2/1/97 was first passed through the reactor with the copper oxide catalyst and then through the reactor with the nickel catalyst. The gas flow flowing from the latter reactor contained hydrogen and carbon monoxide in a ratio of approximately 1.8.

EXAMPLE 4

1 g of the nickel on silicon dioxide catalyst with a sieve fraction of 150 to 425 μm was reduced in a mixture of 10 volume parts of hydrogen in argon. The temperature of the catalyst bed was adjusted to 550° C. While the temperature of the bed was maintained at 550° C., a gas mixture consisting of 2 volume parts of methane and 1 volume part of oxygen in argon was passed through the catalyst bed for 1 week. Then the catalyst was examined in the transmission electron microscope. It was found that no carbon had been deposited on the nickel particles and that no filamentary carbon had grown from the nickel particles.

EXAMPLE 5

1 g of the nickel on silicon dioxide catalyst with a sieve fraction of 150 to 425 microns was reduced in a mixture of 10 volume parts of hydrogen in argon. After reduction of the catalyst at 480° C. in hydrogen for 5 h, the specific nickel surface was determined by means of hydrogen chemisorption (0.28 ml hydrogen per square meter of nickel). On the basis of this measurement, an average particle size of 4.6 nm was calculated. The temperature of the catalyst bed was adjusted to 550° C. While the temperature of the bed was maintained at 550° C., a gas mixture consisting of 2 volume parts of methane and 1 volume part of oxygen in argon was passed through the catalyst bed for 1 week. Then the catalyst was examined in the transmission electron microscope. It was found that no filamentary carbon had grown from the nickel particles.

EXAMPLE 6

To study the carbonization behavior of standard supported nickel catalysts, a silica-supported nickel catalyst was prepared in accordance with the method conventionally used in the literature to prepare supported nickel catalysts, viz. by means of impregnation. For that purpose, 25 g nickel nitrate (Merck) was dissolved in 102 ml demineralized water. 15 g silica (Aerosil 200, DEGUSSA) was introduced into a beaker and then the aqueous solution of nickel nitrate was added to the silica. This catalyst obtained through the so-called incipient wetness impregnation, was dried in the air at room temperature. The dried solid substance was calcined in the air at 450° C. for 3 h. After reduction of the sample in hydrogen at 80° C. for 3 h, the specific nickel surface of the catalyst was determined at room temperature by means of hydrogen chemisorption (0.28 ml hydrogen per square meter of nickel). On the basis of this, an average nickel particle size of 26.2 nm was found. About 50 mg of the catalyst was transferred to a thermogravimetric balance. The sample was heated up to 480° C. in a flow of nitrogen.

Then the catalyst was reduced at the same temperature in a gas flow of hydrogen for 3 h. Then the catalyst was exposed at 450° C. to a gas mixture consisting of 2 volume parts of methane and 1 volume part of oxygen in argon which had previously been passed over 1 gram of an alumina-supported copper oxide catalyst at a temperature of 550° C. The mass of the sample was monitored as a function of the time. After a period of about 70 min. in which the mass did not change, the mass suddenly increased markedly. After 15 h the measurement was stopped and the catalyst was examined by means of the Transmission Electron Microscope. The density of filamentary carbon was found to be high.

EXAMPLE 7

24 g silica (Aerosil 200, DEGUSSA) was suspended in 350 ml demineralized water. The pH of the suspension was adjusted to 9 by adding an aqueous solution of ammonia. After about 20 min. 23 ml of an aqueous solution of 4.41 weight percent of tetrammine-palladium(II)nitrate (Johnson Matthey) was added to this suspension with stirring. Then the volume of the suspension was supplemented to a volume of 800 ml using demineralized water. After stirring for 17 h, the suspension was filtered off. The residue was washed twice with 100 ml demineralized water. The solid substance was dried under a gas flow of nitrogen at room temperature for 4 days. The sample was finally transferred to a quartz microflow™ reactor. Over the dried solid substance thus obtained, a helium flow was passed at room temperature for 30 min. Then the sample was heated up to 400° C. at a rate of 10° C. in a mixture of 10 volume percent of hydrogen in helium. After 3 h at 400° C., the sample was cooled in helium to room temperature. Using a Transmission Electron Microscope (TEM), it was established that the silica™- supported palladium catalyst prepared in this way contains palladium particles of a size of approximately 20 nm. About 50 mg of this catalyst was heated up to 150° C. in a thermogravimetric balance in a flow of nitrogen. At this temperature the sample was reduced in a flow of hydrogen for 30 min. The sample thus reduced was heated up to 525° C. in a flow of nitrogen. Then a gas mixture consisting of 2 volume parts of methane, 1 volume percent of oxygen in argon was passed over a supported copper oxide catalyst at 600° C. and subsequently passed to the palladium catalyst. The mass of the catalyst was monitored as a function of the time. After a period of about 80 min. in which the mass did not change or hardly changed, the mass of the sample suddenly increased markedly. After 15 h the measurement was stopped and the sample was examined by means of the transmission electron microscope. It was found that much filamentary carbon had grown from the palladium particles.

We claim:

1. A process for the endothermic catalytic conversion of gaseous hydrocarbons with steam to form a gaseous mixture which contains hydrogen, utilizing a reform catalyst based on nickel as particles, which is provided on a thermostable support, wherein at least 90% of the nickel particles (based on the number) are smaller than 10 nm and at least a part of thermal energy required for the endothermic conversion is generated in a reaction mixture through a controlled catalytic reaction of a part of the hydrocarbon feed with oxygen.

2. A process according to claim 1, characterized in that at least 90% of the nickel particles (based on the number) are smaller than 5 nm.

3. A process according to claim 1, characterized in that the number of nickel particles that is smaller than said value is at least 95%.

4. A process according to claim 1, characterized in that the composition of the resultant gas mixture is controlled by adjusting the temperature at which the catalytic conversion of the hydrocarbons with steam takes place.

5. A process according to claim 1, characterized in that said oxygen-containing gas is selected from the group consisting of air, pure oxygen and oxygen-enriched air.

6. A process according to claim 1, characterized in that, as oxidation catalyst, use is made of nickel oxide, which is preferably present in the same reactor as the catalyst for the conversion with steam.

7. A process according to claim 1, characterized in that the conversion with oxygen is carried out in a separate reactor over an oxidation catalyst which is not exclusively based on nickel.

8. A process according to claim 7, characterized in that the oxidation catalyst is a copper or manganese oxide provided on a thermostable support.

9. A process according to claim 1, characterized in that said hydrocarbon includes methane; said methane and oxygen are supplied to the oxidation catalyst and the mixture obtained by oxidation is passed over a nickel catalyst, which catalyzes the conversion of methane with $H_2O$.

10. A process according to claim 9, characterized in that steam and/or methane and/or carbon dioxide is added to the mixture resulting from the oxidation reactor before passing the gas flow over the nickel catalyst.

11. A process according to claim 1, characterized in that the conversion with oxygen is carried out in two steps, the first step comprising allowing the oxidation catalyst to incorporate oxygen in the absence of the hydrocarbon and the second step comprising converting the hydrocarbon with incorporated oxygen in the absence of oxygen.

12. A process according to claim 11, characterized in that alternately air, a flushing gas and said hydrocarbon, optionally mixed with steam, are passed over the oxidation catalyst.

13. A process according to claim 2, characterized in that the number of nickel particles that is smaller than said value is at least 95%.

14. A process according to claim 2, characterized in that:

the number of nickel particles that is smaller than said value is at least 98%;

the composition of the resultant gas mixture is controlled by adjusting the temperature at which the catalyst conversion of the hydrocarbons with steam takes place;

the fraction of the hydrocarbon which is converted with oxygen is controlled;

an oxygen-containing gas is added to the reaction mixture and the resultant mixture is passed over a oxidation catalyst;

said oxygen-containing gas is selected from the group consisting of air, pure oxygen and oxygen-enriched air;

methane and oxygen are supplied to the oxidation catalyst and the mixture obtained by oxidation is passed over a nickel catalyst, which catalyzes the conversion of methane with $H_2O$; and steam and/or methane and/or carbon dioxide is added to the mixture resulting from the oxidation reactor before passing the gas flow over the nickel catalyst.

15. A process according to claim 14, characterized in that, as oxidation catalyst, use is made of nickel oxide, which is present in the same reactor as the catalyst for the conversion with steam.

16. A process according to claim 14, characterized in that the conversion with oxygen is carried out in a separate reactor over an oxidation catalyst which is not exclusively based on nickel.

17. A process according to claim 16, characterized in that the oxidation catalyst is a copper or manganese oxide provided on a thermostable support.

18. A process according to claim 1, characterized in that at least 90% of the nickel particles (based on the number) are smaller than 3 nm.

19. A process according to claim 1, characterized in that the number of nickel particles that is smaller than said value is at least 98%.

20. A process according to claim 2, characterized in that the number of nickel particles that is smaller than said value is at least 98%.

* * * * *

UNITED STATES PATENT AND TRADEMARK OFFICE
CERTIFICATE OF CORRECTION

PATENT NO. : 5,714,092
DATED : February 3, 1998
INVENTOR(S) : Francine van Looij, et al.

It is certified that error appears in the above-identified patent and that said Letters Patent is hereby corrected as shown below:

Column 3, line 13, "Outlet" should read --outlet--.

Column 3, line 16, "support comes into" should read --support, comes into--.

Column 3, line 38, "filaments, Therefore" should read --filaments. Therefore--.

Column 3, line 58, "After Stabilization" should read --After stabilization--.

Column 3, line 60, "splnel" should read --spinel--.

Column 4, line 56, "no a" should read --to a--.

Column 5, line 21, "reaction heal." should read --reaction heat.--.

Column 6, line 4, "magnesia" should read --magnesium--.

UNITED STATES PATENT AND TRADEMARK OFFICE
CERTIFICATE OF CORRECTION

PATENT NO.   : 5,714,092
DATED        : February 3, 1998
INVENTOR(S)  : Francine van Looij, et. al.

It is certified that error appears in the above-identified patent and that said Letters Patent is hereby corrected as shown below:

Column 8, line 7, "80°C." should read --480°C.--.

Signed and Sealed this

Twenty-first Day of September, 1999

Attest:

Q. TODD DICKINSON

*Attesting Officer*          *Acting Commissioner of Patents and Trademarks*